2,792,402

PYRIDOXAMIN DERIVATIVES AND PROCESS FOR THE MANUFACTURE THEREOF

Paul Karrer and Max Viscontini, Zurich, Switzerland, assignors to Hoffmann-La Roche Inc., Nutley, N. J., a corporation of New Jersey No Drawing. Application September 4, 1952,
Serial No. 307,897

Claims priority, application Switzerland
September 14, 1951

6 Claims. (Cl. 260—296)

The invention concerns pyridoxamin-derivatives, more specifically pyridoxamin-5'-tri(and mono)phosphoric acid ester and alkaline earth salts of the latter and provides a process for the manufacture of pyridoxamin-5'-phosphoric acid ester and its salts, which comprises reacting polymeric m-phosphoric acid with pyridoxamin or a salt thereof, preferably with heating, and if desired, hydrolysing the pyridoxamin-5'-triphosphoric acid ester (Formula I) to the pyridoxamin-5'-monophosphoric acid ester (Formula II), whereupon the esters produced may be converted into their alkaline earth salts.

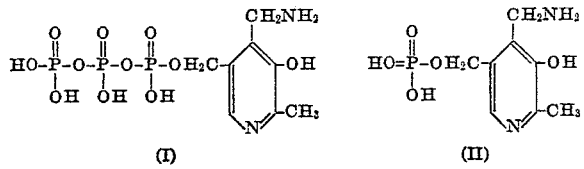

The hydrolysis of the triphosphoric acid ester I is preferably carried out by heating with water. Two mols of phosphoric acid are thereby separated and the phosphoric acid salt of the monophosphoric ester II is formed.

Both the triphosphoric acid ester I and the monophosphoric acid ester II are easily water soluble compounds of acid reaction. The calcium salt of the monophosphoric acid ester is water soluble to a considerable extent.

The pyridoxamin-5'-phosphoric acid esters thus obtained may be used therapeutically.

Example 1 m-Phosphoric acid is prepared by slowly heating orthophosphoric acid over a free flame until all the water has distilled off and the solution turns turbid.

After cooling down the m-phosphoric acid which has been obtained according to the above description from 1.5 cc. of o-phosphoric acid, 200 mg. of pyridoxamin-dihydrochloride are introduced therein and the mixture is slowly warmed up in an oil bath until the temperature of the bath is between 60–70° C. First hydrogenchloride separates, which separation is completed after ½ hour. The mixture is then cooled with ice, triturated with a little ice water to form a viscous material and a large amount of ethanol is then added, thus causing precipitation of pyridoxamin-5'-triphosphoric acid ester. The latter is centrifuged off and washed with alcohol and water. Yield 350 mg. The compound is very easily soluble in water. Its phosphorus content amounts to about 21%.

To hydrolyze the said triphosphoric acid ester, 200 mg. thereof are boiled for about two hours with 20 cc. of water. Analyses performed in the course of the said two hours show that after 2 hours' heating 2 mols of phosphoric acid have been separated. The aqueous solution is then concentrated in vacuo at 30° C. and the residue is triturated with dry alcohol until it solidifies. For purification purposes it is taken up in a little water and reprecipitated with alcohol. Yield 130 mg. The product consists of a phosphoric acid salt of pyridoxamin-5'-monophosphoric acid ester.

The manufacture of a magnesium salt and of a calcium salt, respectively, of the said compound may be effected in the following manner: The phosphoric acid salt of pyridoxamin-5'-monophosphoric acid ester is dissolved in a little water, whereupon so much of the suspension of colloidal magnesium hydroxide is added until the pH of the mixture has reached a value of 6–7. Then ammonia is added until the reaction is strongly alkaline, the precipitate formed is centrifuged off and extracted several times with water. Thereafter the mother liquor or the precipitate and the several extracts are concentrated to a low volume, a further amount of magnesium hydroxide is added until the pH has reached 8–9, the precipitate formed is centrifuged off and alcohol is added to the filtrate. The magnesium salt of pyridoxamin-5'-monophosphoric acid ester is thereby precipitated. After having been triturated several times with absolute alcohol, it becomes pulverulent. It is easily soluble in water.

By the addition of calcium acetate to the aqueous solution of the magnesium salt, one may obtain the calcium salt. First a precipitate is formed which still contains some calcium phosphate. By adding methanol to the filtrate obtained by filtration of this precipitate, the calcium salt of pyridoxamin-5'-monophosphoric acid ester separates in the form of a precipitate which may be filtered off easily. The latter is centrifuged off and washed with alcohol and ether.

The calcium salt of pyridoxamin-5'-monophosphoric acid ester dissolved in a 1% aqueous sodium acetate solution has an absorption spectrum, which is characterized by 2 maxima at 252 and 325 m$\mu$ and 2 minima at 235 and 272 m$\mu$.

Example 2

700 mg. of pyridoxamin-5'-triphosphate are hydrolyzed as described in Example 1 by heating with 70 cc. of water so as to form pyridoxamin-5'-monophosphate. The solution is concentrated at 30° C. in vacuo to a volume of 10 cc. Solid calcium hydroxide is then introduced in small portions until the pH of the solution has reached 5–6 and the pH is then adjusted to 8 by careful addition of calcium hydroxide solution. The precipitate is centrifuged off, extracted several times with warm water, the united filtrates and extracts are concentrated in vacuo at 30° C. filtered again and then absolute alcohol is added to the filtrate, thereby causing precipitation of the calcium salt of pyridoxamin-5'-monophosphoric acid ester. The mother liquors of this first precipitate are concentrated at 30° C. to a volume of 2–3 cc., whereupon, after filtration, the addition of alcohol causes a second precipitation of the calcium salt of pyridoxamin-5'-phosphoric acid ester. Yield 150 mg. The phosphorus content of the solution is 8.0%.

Example 3

600 mg. of pyridoxamin-5'-triphosphate, prepared according to Example 1 by treating pyridoxamin with m-phosphoric acid, are dissolved in 60 cc. of N-hydrochloric acid, and the solution obtained is heated for 10 minutes in a boiling water bath. The solution is then immediately cooled down and then concentrated in vacuo at 30° C. to dryness. The residue is triturated with alcohol, thus forming a colorless, at first sticky, material which after repeated trituration becomes solid. The precipitate is centrifuged off and washed with alcohol and ether and dried. The yield amounts to 300 mg. pyridoxamin-5'-monophosphate-hydrochloride. For crystallisation purposes, this salt is dissolved in very little water, one drop of hydrochloric acid is added and the solution is poured into alcohol. First a colloid solution is formed, from which after several hours the hydrochloric salt separates in large crystals. After sucking off and drying, the compound is a colorless crystal powder, which is only slightly hygroscopic. The product is easily soluble in water with acid reaction. Melting point 224° C. (with decomposition).

We claim:

1. A process which comprises reacting a compound selected from the group consisting of pyridoxamin and salts thereof with polymeric m-phosphoric acid to produce pyridoxamin-5'-triphosphoric acid ester.

2. A process according to claim 1, wherein the pyridoxamin-5'-triphosphoric acid ester formed is hydrolysed by means of water to produce pyridoxamin-5'-monophosphoric acid ester.

3. A process according to claim 2, wherein the pyridoxamin-5'-monophosphoric acid ester is transformed into an alkaline earth salt by treatment with an alkaline earth metal compound.

4. Pyridoxamin-5'-triphosphoric acid ester.

5. A process which comprises heating a compound selected from the group consisting of pyridoxamine and salts thereof with polymeric m-phosphoric acid, said polymeric m-phosphoric acid being prepared by slowly heating o-phosphoric acid over a free flame until all the water has distilled off and the solution turns turbid, then cooling and separating pyridoxamin-5'-triphosphoric acid ester.

6. A process according to claim 5, wherein the pyridoxamin-5'-triphosphoric acid ester is hydrolyzed by heating with water to produce pyridoxamin-5'-monophosphoric acid ester.

References Cited in the file of this patent
UNITED STATES PATENTS

| | | |
|---|---|---|
| 2,519,470 | Hoffman | Aug. 22, 1950 |
| 2,666,061 | Harris et al. | Jan. 12, 1954 |

OTHER REFERENCES

Viscontini et al.: Helv. Chim. Acta, vol. 32, pp. 1478–84 (1949).

Viscontini et al.: Helv. Chim. Acta, vol. 34, pp. 2199–2202 (1951).

Farrel et al.: J. Am. Chem. Soc., vol. 70, pp. 2101–3 (1948).